United States Patent
Bonaccio et al.

(10) Patent No.: US 7,135,907 B2
(45) Date of Patent: Nov. 14, 2006

(54) CLOCK SIGNAL DISTRIBUTION UTILIZING DIFFERENTIAL SINUSOIDAL SIGNAL PAIR

(75) Inventors: Anthony Richard Bonaccio, Shelburne, VT (US); John Maxwell Cohn, Richmond, VT (US); Alvar Antonio Dean, Groton, MA (US); Amir H. Farrahi, Peekskill, NY (US); David J. Hathaway, Underhill Center, VT (US); Sebastian Theodore Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/255,707

(22) Filed: Oct. 21, 2005

(65) Prior Publication Data

US 2006/0038602 A1    Feb. 23, 2006

Related U.S. Application Data

(63) Continuation of application No. 09/682,473, filed on Sep. 6, 2001, now Pat. No. 7,071,757.

(51) Int. Cl.
*H03K 3/00* (2006.01)
(52) U.S. Cl. ...................... 327/295; 327/296
(58) Field of Classification Search ............... None
See application file for complete search history.

(56) References Cited

U.S. PATENT DOCUMENTS

| | | |
|---|---|---|
| 4,766,399 A | 8/1988 | Davis et al. ............ 331/108 R |
| 5,043,596 A | 8/1991 | Masuda et al. ............. 327/292 |
| 5,157,277 A | 10/1992 | Tran et al. ................. 327/156 |
| 5,281,861 A | 1/1994 | Tran et al. ................. 327/141 |
| 5,397,943 A | 3/1995 | West et al. ................... 326/39 |
| 5,426,392 A | 6/1995 | Kornfeld .................... 327/551 |
| 5,448,188 A | 9/1995 | Matsumoto et al. .......... 327/65 |
| 5,656,961 A | 8/1997 | Tran et al. ................. 327/184 |
| 5,726,596 A | 3/1998 | Perez ......................... 327/292 |
| 5,838,203 A | 11/1998 | Stamoulis et al. .......... 331/1 A |
| 5,850,157 A | 12/1998 | Zhu et al. ................... 327/295 |
| 6,184,736 B1 | 2/2001 | Wissell et al. ............. 327/295 |
| 6,271,725 B1 * | 8/2001 | Rao et al. .................. 330/252 |

FOREIGN PATENT DOCUMENTS

| | | |
|---|---|---|
| JP | 1124014 | 5/1989 |
| JP | 3125283 | 5/1991 |
| JP | 10242953 | 9/1998 |

OTHER PUBLICATIONS

J.G. Maneatis, "Low-Jitter Process-Independent DLL and PLL Based on Self-Biased Techniques", IEEE Journal of Solid-State Circuits, vol. 31, Nov. 1996, pp. 1723-1732.

* cited by examiner

*Primary Examiner*—Timothy P. Callahan
*Assistant Examiner*—An T. Luu
(74) *Attorney, Agent, or Firm*—Michael Lestrange; Dugan & Dugan PC

(57) ABSTRACT

A differential sinusoidal signal pair is generated on an integrated circuit (IC). The differential sinusoidal signal pair is distributed to clock receiver circuits, which may be differential amplifiers. The clock receiver circuits receive the differential sinusoidal signal pair and convert the differential sinusoidal pair to local clock signals. Power consumption and noise generation are reduced as compared to conventional clock signal distribution arrangements.

14 Claims, 3 Drawing Sheets

CLOCK SIGNAL DISTRIBUTION UTILIZING DIFFERENTIAL SINUSOIDAL SIGNAL PAIR

This application is a continuation of U.S. patent application Ser. No. 09/682,473 filed Sep. 6, 2001, now U.S. Pat. No. 7,071,757 which is hereby incorporated by reference herein in its entirety.

FIELD OF THE INVENTION

This invention is concerned with integrated circuits (ICs), and is more particularly concerned with distribution of clock signals on an IC.

BACKGROUND OF THE INVENTION

At the current state of the art, processors are operating at clock rates of 1 GHz or higher, and further advances in operating rates can be anticipated. However, at current and expected future clock rates, noise generation and power consumption are significant issues in connection with clock signal distribution. For example, in one processor operating at 1 GHz, the power consumption of the clock tree accounts for about 75% of the power consumed by the chip.

Furthermore, with conventional clock distribution techniques it has been considered desirable to limit the amount of clock gating employed in processors operating at the high frequencies referred to above, since turning on and off gated clocks may result in noise spikes.

Accordingly, it would be desirable to provide clock signal distribution in a manner that accommodates very high clock frequencies with a reduced noise profile and reduced power consumption.

SUMMARY OF THE INVENTION

According to an aspect of the invention, a method of generating a clock signal on an IC is provided. The method includes generating a differential sinusoidal signal pair, and generating a clock signal from the differential sinusoidal signal pair for the IC.

According to another aspect of the invention a method of driving a clock tree on an IC includes distributing a clock signal in the form of a differential sinusoidal signal pair in a portion of the clock tree.

According to still another aspect of the invention, a clock circuit for an IC includes a generating circuit for generating a differential sinusoidal signal pair, a distribution circuit coupled to the generating circuit for distributing the differential sinusoidal signal pair on the IC, and a plurality of clock receiver circuits coupled to the distribution circuit for converting the differential sinusoidal signal pair into respective local clock signals.

Since a differential sinusoidal signal pair is used for distributing the clock signal, very low-swing signals may be employed, thereby greatly economizing on power consumption. Moreover, since local clock signal regeneration is performed on a differential basis with reference to the distributed pair of signals, noise which couples to both of the pair of signals is automatically filtered out. Also, since the clock signal is sinusoidal prior to regenerating, its energy is concentrated at the clock frequency rather than being spread through the spectrum as in the case of a square wave clock signal. Consequently, energy efficiency is promoted.

Other objects, features and advantages of the present invention will become more fully apparent from the following detailed description, the appended claims and the accompanying drawings.

DETAILED DESCRIPTION

Figure 1:
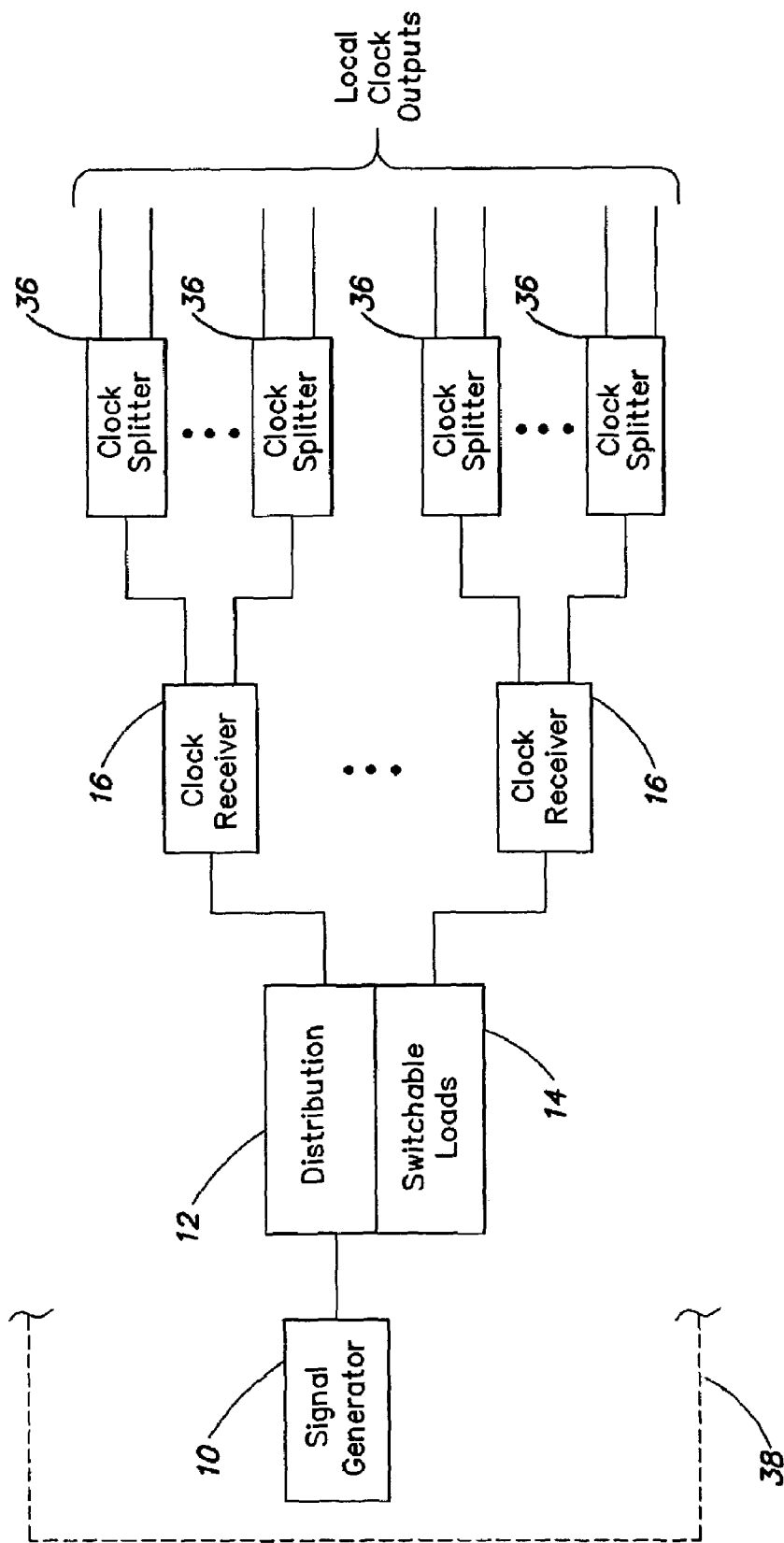
FIG. 1 is a schematic block diagram representation of a clock signal generation and distribution arrangement provided in accordance with the invention.

FIG. 1 is a schematic block diagram representation of a clock signal generation and distribution arrangement provided in accordance with the invention.

Figure 3:
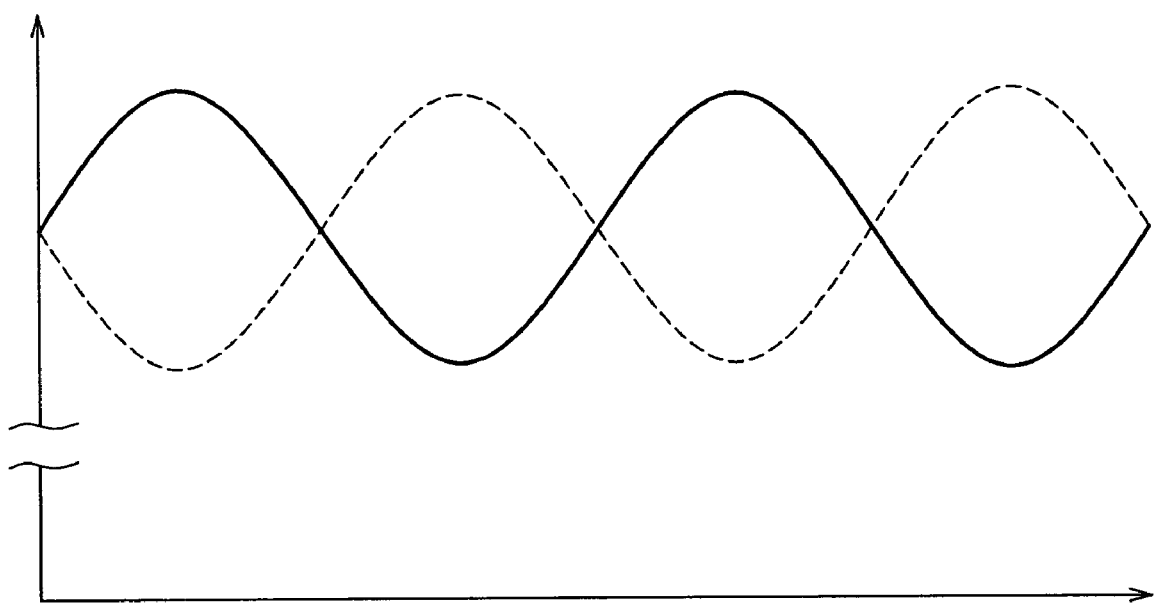
FIG. 3 is a waveform diagram that illustrates a differential sinusoidal signal pair that may be generated in the clock signal generation and distribution arrangement of FIG. 1.

In FIG. 1, reference numeral 10 indicates a signal generator which generates a differential sinusoidal signal pair. As is well understood by those who are skilled in the art, a differential sinusoidal signal pair comprises a pair of sinusoidal wave forms, that are substantially equal in frequency and amplitude but that are substantially 180° out of phase with each other, as illustrated in FIG. 3. The differential sinusoidal signal pair generated by signal generator 10 may, for example, have a peak to peak differential (ppD) of about 100 mV or 150 mV. The common mode level of the differential sinusoidal signal pair may be at the center of the power supply voltage. For example, each signal of the pair may swing from about 575 mV to 625 mV when a 1.2 volt power supply is used. It will be recognized that such a differential sinusoidal signal pair has a peak to peak differential of 100 mV. It is contemplated to employ a differential sinusoidal signal pair having a different common mode and/or a different peak to peak differential than the signals which have been described above.

It is well within the ability of those who are skilled in the art to design a suitable signal generator to generate the differential sinusoidal signal pair as described above using conventional circuit design techniques. Accordingly, it is not necessary to describe the design of the signal generator 10.

Continuing to refer to FIG. 1, distribution circuitry 12 is coupled to signal generator 10. The distribution circuitry 12 distributes the differential sinusoidal signal pair from the signal generator 10 to points on an integrated circuit at which local clock signals are to be generated (as described below).

In order to provide for minimal skew, in at least one embodiment of the invention it is preferred that the distribution circuitry 12 include adjacent tracks of metal lines through which the respective signals of the differential sinusoidal signal pair are routed together (e.g., so that each signal travels approximately the same distance). It is also preferred that there be one or two tracks of isolation between the respective tracks for the signal pair to reduce mutual coupling capacitance. Such a routing layout can be provided using commercially available routing tools. Other routing layouts may be employed.

Because it is contemplated to use very small swing signals for the differential sinusoidal signal pair, the additional capacitance resulting from two clock signal nets instead of one is more than compensated for relative to the capacitance that would be generated by a single full-swing digital clock.

It may be desirable for the distribution circuitry 12 to be routed and loaded so as to have inductance and capacitance that produces resonance at the desired frequency of operation. This further reduces the clock power requirements. Switchable loads 14 may be included in the distribution circuitry 12 to permit the load of the distribution circuitry 12 to be tuned to compensate for manufacturing variations.

Coupled to the distribution circuitry 12 are clock receivers 16. The purpose of the clock receivers 16 is to receive the differential sinusoidal signal pair distributed through the distribution circuitry 12 and to convert the differential sinusoidal signal pair to local clock signals having a suitable wave form and amplitude. The local clock signals may, but need not be, in the form of a square wave. The local clock signals output by the clock receivers 16 may, for example, swing from substantially zero volts to substantially the level of the power supply, which may be 1.2 volts or any other suitable voltage. It will accordingly be recognized that the peak to peak differential of the differential sinusoidal signal pair distributed through the distribution circuitry 12 may be on the order of less than half or less than one-fifth or even less than one-tenth of the amplitude of the local clock signals outputted from the clock receivers 16.

The number of clock receivers 16 may vary, and depends on the architecture of the IC for which clock distribution is to be provided.

Figure 2:
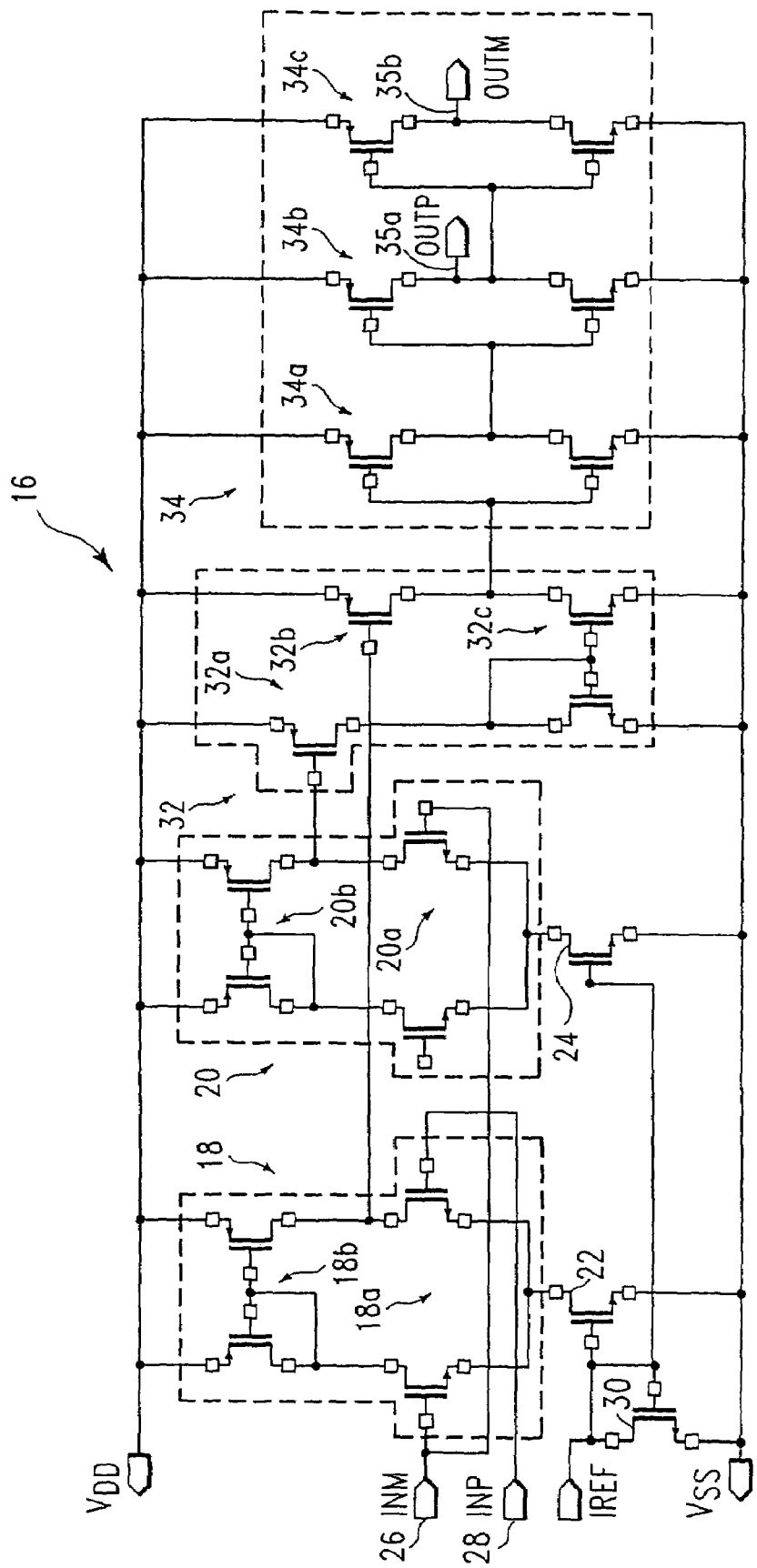
FIG. 2 is a schematic diagram of a typical one of the clock receivers shown in FIG. 1.

The clock receivers 16 may comprise, for example, differential amplifiers such as the differential-to-single-ended converter illustrated in FIG. 2. The circuit shown in FIG. 2 is similar to conventional differential-to-single-ended converters and accordingly need not be described in detail. It will be observed that the circuit of FIG. 2 includes a first differential amplification stage 18 and a second differential amplification stage 20. The first differential amplification stage 18 and the second differential amplification stage 20 are respectively dc biased by FETs 22 and 24 and are coupled with opposite polarity to the differential sinusoidal signal pair supplied at inputs 26 and 28. FET 30 is provided so that a predictable current is supplied to FETs 22 and 24 (e.g., from a current source provided via input IREF).

Downstream from the amplification stages 18 and 20 are a third amplification stage 32 and output stages 34.

In the embodiment of FIG. 2, the first and second amplification stages 18, 20 each comprise an NMOS differential transistor pair 18a, 20a with PMOS current mirror active loads 18b, 20b. The third amplification stage 32 comprises a PMOS differential pair (forward from transistors 32a, 32b) with an NMOS current mirror active load 32c. The output stages 34 comprise three conventional series-connected FET inverters 34a, 34b and 34c which produce complimentary outputs 35a, 35b. Other differential transistor pair configurations and/or buffering output stages may be employed.

In operation, the differential sinusoidal signal pair is provided to the inputs 26, 28. In response thereto, the first amplification stage 18 produces a first input to the third amplification stage 32 that is proportional to the difference between the inputs 26, 28. Similarly, the second amplification stage 20 produces a second input to the third amplification stage 32 that is proportional to the difference between the inputs 26, 28, but that is of opposite polarity to the first input provided by the first amplification stage 18. The third amplification stage 32 comprises the difference between the first and second inputs thereto (e.g., about twice the value of the output of either the first or second amplification stages 18, 20) to produce an output that is fed to the output stages 34. The output stages 34 further amplify the output of the third amplification stage 32 to produce complimentary outputs 35a, 35b that fully transition between ground (e.g. $V_{SS}$) and the power supply rail (e.g., $V_{DD}$).

Because the inputs 26, 28 to the clock receiver circuit 16 shown in FIG. 2 are routed together, any noise experienced by one of the inputs is also experienced by the other input, and such noise is filtered by the clock receiver circuit 16 because it is a differential amplifier. Because of the noise immunity provided by the clock receiver circuits 16, the signals distributed to the distribution circuit 12 may have very low voltage swings, which results in reduced power dissipation.

If the clock receiver circuit 16 shown in FIG. 2 is balanced, then the output signals have 50% duty cycle. Ideally, the outputs 35a, 35b are non-overlapping (e.g., the output 35a is never high at the same time that the output 35b is high, or vice versa, as the outputs 35a, 35b are complimentary. It is also contemplated to create imbalances in the clock receiver circuit 16 of FIG. 2 by, e.g., arranging the dimensions of pairs of FETs to be different within one or more of the amplification stages 18, 20, 32 to create a non-50% duty cycle. In general, any technique that can controllably introduce asymmetry to differential amplifier transistor pairs may be similarly employed (e.g., manipulating doping levels, threshold voltage implant doses, etc.). In this way, the purely differential input could be converted to a set of non-overlapping clock signals, which would be suitable for use with latches that call for non-overlapping clocks.

Those who are skilled in the art will recognize that many modifications and variations of the circuit shown in FIG. 2 would be suitable for use as the clock receivers 16 of FIG. 1. Design of this or other suitable types of clock receiver circuitry is well within the ability of those who are skilled in the art.

Referring once more to FIG. 1, clock splitters 36 are provided downstream from clock receivers 16. In one embodiment of the invention, about ten clock splitters 36 are coupled to each clock receiver 16. Other numbers of clock splitters may be coupled to each clock receiver 16. The clock splitters 36 are provided for further distribution of the regenerated clock signals output from the clock receivers 16 (as is known in the art). The clock splitters 36 also generate non-overlapping clocks for latches which call for such signals. Any conventional clock splitters may be employed for the clock splitters 36.

Because of the low noise profile of the clock distribution system illustrated in FIG. 1, it is feasible to employ a substantial amount of clock gating. The clock gating may be implemented, for example, by selectively gating off the clock receivers 16 using any conventional clock gating technique.

From the foregoing description it will be understood that all of the signal generator 10, the distribution circuitry 12, the clock receivers 16 and the clock splitters 36 may be formed on an integrated circuit (IC) 38 such as a microprocessor. It will also be recognized that the circuitry between signal generator 10 and the outputs of clock splitters 36 constitutes some or all of a clock tree.

With the clock signal distribution arrangement provided in accordance with the present invention, power consumption is reduced and noise generation is minimized, as compared to conventional clock signal distribution techniques. The present invention also accommodates clock gating and generation of a set of non-overlapping clocks.

The foregoing description discloses only the exemplary embodiments of the invention; modifications of the above disclosed apparatus and methods which fall within the scope of the invention will be readily apparent to those of ordinary skill in the art. For example, although the present invention is particularly suited for application to microprocessors, it may also be used in connection with any other type of integrated circuit for which clock distribution is employed.

While the present invention has been disclosed in connection with exemplary embodiments thereof, it should be understood that other embodiments may fall within the spirit and scope of the invention, as defined by the following claims.

The invention claimed is:

1. A method of driving a clock tree on an integrated circuit (IC), the method comprising the steps of:
   providing an IC having a clock tree;
   distributing a clock signal in the form of a differential sinusoidal signal pair in a portion of the clock tree, the differential sinusoidal signal pair comprising a first sinusoidal signal and a second sinusoidal signal; and
   generating a local clock signal from the differential pair by employing both the first sinusoidal signal and the second sinusoidal signal to form the local clock signal;
   wherein generating the local clock signal includes using a differential amplifier.

2. The method of claim 1, wherein the differential pair has a peak to peak differential of not more than about 150 mV.

3. The method of claim 2, wherein the differential pair has a peak to peak differential of substantially 100 mV.

4. The method of claim 1 wherein the local clock signal has an amplitude substantially equal to a power supply voltage, and the differential sinusoidal signal pair has a peak to peak differential that is substantially less than the amplitude of the local clock signal.

5. The method of claim 1, wherein the local clock signal is a square wave signal.

6. A clock circuit for an IC, comprising:
   a generating circuit adapted to generate a differential sinusoidal signal pair comprising a first sinusoidal signal and a second sinusoidal signal;
   a distribution circuit coupled to the generating circuit and adapted to distribute the differential sinusoidal signal pair on the IC; and
   a plurality of clock receiver circuits coupled to the distribution circuit and adapted to convert the differential sinusoidal signal pair into respective local clock signals by employing a respective differential amplifier and both the first sinusoidal signal and the second sinusoidal signal to form each local clock signal.

7. The clock circuit of claim 6, wherein the local clock signals have an amplitude substantially equal to a power supply voltage, and the differential sinusoidal signal pair has a peak to peak differential that is substantially less than the amplitude of the local clock signals.

8. The clock circuit of claim 7, wherein the peak to peak differential of the differential sinusoidal signal pair is less than half the amplitude of the local clock signals.

9. The clock circuit of claim 8, wherein the peak to peak differential of the differential sinusoidal signal pair is less than one-fifth the amplitude of the local clock signals.

10. The clock circuit of claim 9, wherein the peak to peak differential of the differential sinusoidal signal pair is less than one-tenth the amplitude of the local clock signals.

11. The clock circuit of claim 6, wherein the differential pair has a peak to peak differential of not more than about 150 mV.

12. The clock circuit of claim 11, wherein the differential pair has a peak to peak differential of substantially 100 mV.

13. The clock circuit of claim 6 wherein the distribution circuit includes means for tuning a frequency response of the distribution circuit.

14. The clock circuit of claim 6, wherein each local clock signal is a square wave signal.

* * * * *